United States Patent Office 3,122,593
Patented Feb. 25, 1964

3,122,593
PROCESS FOR THE HYDROGENATION OF
NAPHTHALENE
Thomas P. Wilson, Charleston, and George F. Hurley, St. Albans, W. Va., assignors to Union Carbide Corporation, a corporation of New York
No Drawing. Filed Dec. 6, 1960, Ser. No. 73,978
7 Claims. (Cl. 260—667)

The present invention relates to organic processes, and more particularly, is concerned with an improved process for the hydrogenation of naphthalene in which an alkali metal catalyst is employed.

Metallic sodium is known to catalyze the liquid phase hydrogenation of naphthalene selectively to tetralin. In this reaction, the use of sodium also serves to remove the sulfur-containing compounds commonly present as contaminants in technical grade naphthalene. The necessity of utilizing a sulfur-free naphthalene as feed is thereby eliminated and the quality of tetralin produced is substantially improved. The liquid phase hydrogenation of naphthalene has also been catalyzed by metallic potassium alone, or in admixture with metallic sodium. In such a reaction, appreciable yields of hydrogenated binaphthyls are also often formed as products in addition to tetralin.

A disadvantage frequently encountered in the application of these processes, however, is the relatively low reaction rates, that is to say, rates of hydrogenation or conversion of naphthalene, that are obtained, even at elevated temperatures of from 300° C. to 350° C., and hydrogen pressures of 3,000 pounds per square inch gauge or more. High reaction rates are nevertheless found necessary if substantial product yields are to be obtained within an efficient operating period. Moreover, the use of elevated temperatures and pressures during the reaction in an effort to attain high rates of hydrogenation necessarily involves the utilization of equipment and material capable of producing and withstanding such temperatures and pressures, and represents a costly and complex operation.

It is an object of the present invention to provide an improved process for the alkali metal catalyzed hydrogenation of naphthalene whereby reaction rates higher than those heretofore obtainable can be realized. It is another object of the present invention to provide an improved process for the alkali metal catalyzed hydrogenation of naphthalene, which process can satisfactorily be performed at temperatures of 300° C. or less, and at hydrogen pressures of 3,000 pounds per square inch gauge or less. In this connection, it is to be noted that the term alkali metal, as employed herein, is particularly contemplative of sodium and/or potassium, although not necessarily limited thereto.

The present invention is in part based upon the discovery that organic compounds possessing at least one hydrogen atom sufficiently active to be replaced in conventional reaction by an alkali metal will serve to accelerate the alkali metal catalyzed hydrogenation of naphthalene when incorporated in the hydrogenation reaction mixture. For convenience, these organic compounds will hereinafter be referred to as "active hydrogen compounds." It has also been found that the alkali metal catalyzed hydrogenation of naphthalene can be accelerated by the incorporation of the alkali metal derivative or salt of an active hydrogen compound in the hydrogenation reaction mixture, thereby circumventing the use of the active hydrogen compound per se. This result is believed to follow based upon the theory that the incorporation of the active hydrogen compound in the hydrogenation reaction mixture results in the production of the corresponding alkali metal derivative in situ.

In accordance with the process of this invention, when hydrogen is reacted with naphthalene in contact with an alkali metal catalyst and in initial admixture with an active hydrogen compound or an alkali metal derivative thereof, as prescribed herein, the resulting rates of hydrogenation are increased sufficiently to warrant commercial application of the process. In addition, the hydrogenation of naphthalene will thereby proceed satisfactorily at temperatures and pressures lower than those heretofore believed to be necessary for the formation of substantial product yields, hence permitting a more convenient and economical process.

The active hydrogen compounds contemplated by this invention are exemplified by members of the following groups of organic compounds: the primary and secondary aliphatic and aromatic amines, including the aliphatic and aromatic imines; the aliphatic and aromatic alcohols; the aliphatic and aromatic carboxylic acids; the aliphatic and aromatic carbonamides and carbonimides, that is, the amido ($-NH_2$) and imido ($=NH$) derivatives of aliphatic and aromatic carboxylic acids; and the aromatic sulfonic acids. Suitable active hydrogen compounds include, by way of illustration, butylamine, octylamine, dodecenylamine, octadecylamine, dibutylamine, aniline, benzylamine, phenylethylamine, ortho-, meta-, and para-toluidine, naphthylamine, diphenylamine, ortho-phenylene diamine, cyclohexanimine, pyrrolidine, carbazole, phenol, ortho-, meta-, and para-cresol, 2,6-xylenol, catechol, isopropanol, butanol, 2-ethylhexanol, cetyl alcohol, oleyl alcohol, octadecanol, 1,6-hexanediol, benzyl alcohol, alpha-naphthol, caproic acid, capric acid, 2-ethylhexanoic acid, oleic acid, stearic acid, succinic acid, propionamide, caproamide, oleamide, N-2-hydroxyethyl oleamide, stearamide, benzamide, dibenzylamide, succinimide, phthalimide, benzene sulfonic acid, etc., and the like. However, other organic compounds, such as indene or fluorene, similarly capable of reacting with an alkali metal whereby the alkali metal replaces a hydrogen atom of the organic molecule, are also contemplated as active hydrogen compounds within the scope of this invention.

Moreover, as hereinabove mentioned, the corresponding alkali metal derivative of the active hydrogen compound, that is to say, a compound of the aforementioned class in which an active hydrogen atom has been replaced by an alkali metal, can be incorporated in the hydrogenation reaction mixture instead of the active hydrogen compound itself, the alkali metal moiety of such derivative preferably being identical with the alkali metal employed as a catalyst in the reaction. Thus, for example, sodium- or potassium isopropoxide can be employed in place of isopropanol, sodium- or potassium ortho-cresylate can be employed in place of ortho-cresol, sodium- or potassium oleate or stearate can be employed in place of oleic or stearic acid, sodium- or potassium dodecyl benzene sulfonate can be employed in place of dodecyl benzene sulfonic acid, etc., with, perhaps, somewhat varying effect.

The resulting rates of hydrogenation obtained in accordance with the present invention have been determined to be of the first order with respect to naphthalene concentration. First order reaction rate constants may therefore be determined both from hydrogen pressure decrease during the experiment and from naphthalene analysis at its conclusion. The following two tables, based upon these first order reaction rate constants, will better serve to illustrate the quantitative effectiveness of the use of active hydrogen compounds per se in the process of this invention. Experiments from which the data in Table I were obtained were performed using a sodium catalyst under the following operating conditions: a reaction temperature of approximately 285° C., an initial or maximum hydrogen pressure of approximately 2,500 pounds per square inch gauge, and initial sodium and active hydrogen compound concentrations of about 5 parts of each to 100 parts by weight of naphthalene (80.2° C. melting point) unless otherwise indicated in the table.

TABLE I

| Active Hydrogen Compound | First Order Reaction Rate Constant (1/min.) |
|---|---|
| None | 0.002 |
| 2-Ethylhexanoic Acid [1] | 0.007 |
| Stearic Acid | 0.110 |
| Isopropanol | 0.059 |
| 2-Ethylhexanol | 0.061 |
| Cetyl alcohol | 0.067 |
| Heptadecanol [2] | 0.027 |
| N-2-Hydroxyethyl Oleamide [3] | 0.052 |
| 2,6-Xylenol | 0.018 |
| ortho-Cresol | 0.063 |
| meta-Cresol | 0.040 |
| para-Cresol | 0.012 |
| Catechol | 0.012 |
| alpha-Naphthol | 0.026 |
| Carbazole | 0.012 |
| Phthalimide | 0.038 |
| ortho-Toluidine | 0.028 |
| Indene [4] | 0.010 |
| Fluorene | 0.013 |

[1] Conducted at a temperature of approximately 240° C. using a concentration of 1.5 parts of the acid to 100 parts by weight of naphthalene.
[2] Conducted at a temperature of approximately 240° C.
[3] Conducted using a concentration of 1 part of the amide to 100 parts by weight of naphthalene.
[4] Conducted using a concentration of 2 parts of indene to 100 parts by weight of naphthalene.

Experiments from which the data in Table II were obtained were performed using an equal weight mixture of sodium and potassium as catalyst, an equal weight mixture of naphthalene (80.2° C. melting point) and tetralin as a feed, and under the following operating conditions: a reaction temperature of approximately 200° C., an initial or maximum hydrogen pressure of approximately 2,000 pounds per square inch gauge, initial sodium and potassium concentrations of about 2.5 parts of each to 100 parts by weight of naphthalene and an active hydrogen compound concentration of about 2 parts thereof to 100 parts by weight of naphthalene, unless otherwise indicated in the table.

TABLE II

| Active Hydrogen Compound | First Order Reaction Rate Constant (1/min.) |
|---|---|
| None | 0.105 |
| 2-Ethylhexanol | ([1]) |
| 2-Ethylhexanol [2] | 0.047 |
| Stearic Acid | 0.236 |
| Isopropanol [3] | 0.200 |
| Isopropanol [2] | 0.029 |
| Tertiarybutyl Alcohol | 0.170 |

[1] Reaction completed at a temperature below 200° C.
[2] Conducted at a temperature of approximatley 150° C.
[3] Conducted at a temperature of approximately 190° C.

Similarly, the following table, based upon first order reaction rate constants, will better serve to illustrate the effectiveness of the use of alkali metal derivatives of active hydrogen compounds in the process of this invention. Experiments from which the data in Table III were obtained were performed using a sodium catalyst, sodium derivatives of active hydrogen compounds as accelerators, an approximately equal weight mixture of naphthalene (80.2° C. melting point) and mineral oil as a feed, and under the following operating conditions: a reaction temperature of approximately 240° C., an initial or maximum hydrogen pressure of approximately 1,900 pounds per square inch gauge and a sodium concentration of about 5 parts thereof to 100 parts by weight of naphthalene, unless otherwise indicated in the table. In the table, the concentration of the sodium derivative of the active hydrogen compound is indicated as parts thereof to 100 parts by weight of naphthalene.

TABLE III

| Active Hydrogen Compound (Sodium Derivative) | Concentration | First Order Reaction Rate Constant (1/min.) |
|---|---|---|
| None | | 0.0009 |
| Sodium ortho-Cresylate | 6 | 0.002 |
| Sodium Oleate | 5.4 | 0.0065 |
| Sodium Stearate | 5 | 0.0042 |
| Sodium Dodecyl Benzene Sulfonate [1] | 5 | 0.006 |

[1] Conducted in the absence of mineral oil.

From the above tables, it can be seen that the extent to which the alkali metal catalyzed hydrogenation of naphthalene will be accelerated in accordance with the process of this invention will vary depending upon the particular active hydrogen compound, or alkali metal derivative thereof, that is employed. The preferred active hydrogen compounds are those compounds containing from about 3 to about 22 carbon atoms. Similarly, the corresponding alkali metal derivatives of the preferred active hydrogen compounds are also preferred for use in the process of this invention.

When utilizing active hydrogen compounds or their alkali metal derivatives as prescribed by the present invention, the resulting rates of hydrogenation have been found to be substantially independent of hydrogen pressures above approximately 1,500 pounds per square inch gauge. Accordingly, no appreciable change in the conversion rate of naphthalene is effected by a variance in hydrogen pressure above this level. At hydrogen pressures of from about 1,500 to 400 pounds per square inch gauge a gradual decrease in the rate of hydrogenation by a factor of approximately two has been found to occur with decreasing pressure; and at hydrogen pressures of below approximately 250 pounds per square inch gauge, the reaction rate rapidly decreases to such an extent that little or no product yield is obtained within a commercially acceptable period of operation. Generally, hydrogen pressures of from about 1,500 to 400 pounds per square inch gauge have been found most satisfactory for use in the process of this invention.

For good results, the present process should be carried out at temperatures of at least about 150° C. or slightly lower, and preferably in the range of from about 200° C. to about 300° C. Operation at temperatures substantially below 150° C. will ordinarily produce only negligible rates of hydrogenation and consequently a rate of product formation which is insufficient for commercial purposes. As the temperature increases the reaction rate has been found to increase exponentially. Using a sodium catalyst, for example, the reaction rate constant at a pressure of 3,000 pounds per square inch gauge approximately doubles with every 25° C. increase in reaction temperature; at a pressure of 1,000 pounds per square inch gauge, the proportionate increase in reaction rate with temperature is somewhat less. However, when the process is operated at temperatures above 300° C., the advantage of an increased rate of hydrogenation is usually not commensurate with the additional use of special apparatus and other operating procedures necessary to effect the higher reaction temperatures. Moreover, at temperatures of about 300° C., product decomposition is frequently encountered.

Resulting rates of hydrogenation have been found to vary in direct proportion to the concentration of the active hydrogen compound or the alkali metal derivative thereof that is employed in the process of this invention. Particularly good results have been obtained, for example, when the active hydrogen compound or the alkali metal derivative is incorporated in the reaction mixture in a concentration of from about 0.5 to 5.0 parts thereof to 100 parts by weight of naphthalene. Concentrations of below about 0.1 part thereof to 100 parts by weight of naphthalene have not been found to engender substantially increased rates of hydrogenation. On the other hand, the use of concentrations of the active hydrogen compound or of the alkali metal derivative above approximately 5.0 to 10.0 parts thereof to 100 parts by weight of naphthalene, though continuing to effect increased reaction rates, may result in the occurrence of foaming or solids formation within the reaction mass, thereby rendering the subsequent separation of the product more difficult. Some foaming or solids formation was noted, for example, when using stearic acid or N-2-hydroxy ethel oleamide in concentrations of about 5 parts thereof to 100 parts by weight of naphthalene, and when employing 2-ethylhexanol in a concentration of 15 parts thereof to 100 parts by weight of naphthalene.

The amount of alkali metal to be employed must be sufficient to provide and to assure the continual presence of a catalytic amount of a metallic or uncombined alkali metal in the reaction mixture at all times, particularly during the hydrogenation step. To this end, when an active hydrogen compound is utilized as an accelerator in the process of this invention, the alkali metal is generally employed in an amount in excess of the stoichiometric amount theoretically required to replace the active hydrogen atom(s) of the active hydrogen compound by at least about 0.5 part of the alkali metal per 100 parts by weight of the naphthalene present, and preferably by at least about 2 parts of the alkali metal per 100 parts by weight of naphthalene, especially when technical grade naphthalene (78° C. melting point) is used as a reactant. Thus, the amount of alkali metal to be employed can readily be determined by one skilled in the art in light of this disclosure. By way of illustration, one gram atomic weight of sodium will by conventional reaction replace the active hydrogen atoms in one mole of isopropanol. Accordingly, when isopropanol is employed in an embodiment of this invention in a concentration of 10 parts thereof to 100 parts by weight of naphthalene, sodium, when also utilized, is generally employed in a minimal concentration of about 4.3 parts thereof to 100 parts by weight of naphthalene so as to assure the continued presence of a sodium catalyst in the reaction mixture at all times. Under any circumstance, as for example when an alkali metal derivative of an active hydrogen compound is employed in place of the active hydrogen compound itself, a minimal concentration of about 0.5 part, and preferably about 2 parts, of the alkali metal catalyst to 100 parts by weight of naphthalene is employed.

A considerable excess over the minimal alkali metal catalyst concentration is recommended to obviate difficulties which may arise, for example, due to the condensation of moisture in the reaction vessel, or to losses in handling. Concentrations of uncombined alkali metal above approximately 5 to 10 parts thereof to 100 parts by weight of naphthalene, however, while operable, have not been found to effect an additional increase in the rates of hydrogenation thereby obtained.

In the practice of the present invention, naphthalene, an alkali metal and an active hydrogen compound or alkali metal derivative thereof are brought into admixture in a suitable reactor. Hydrogen is subsequently introduced to the reactor and the hydrogen pressure and reaction temperature adjusted to within the desired range. The reaction is allowed to proceed to completion as determined by decrease in hydrogen pressure. Hydrogenation is generally discontinued, for instance, when the rate of decrease in hydrogen pressure becomes less than about one pound per square inch per minute. Upon completion of the hydrogenation, the resulting products can be separated and recovered by any convenient method.

Typical of the manner in which the process of this invention can be performed are the following examples.

*Example I*

The following reactants were introduced to a stainless steel autoclave fitted with a mechanical stirrer:

|  | Grams |
|---|---|
| Naphthalene (80.2° C. melting point) | 200 |
| Stearic acid | 10 |
| Metallic sodium | 10 |

The reactor was purged with hydrogen. A positive hydrogen pressure of approximately 2,500 pounds per square inch gauge was then applied with the reactor heated to a temperature of 285° C. Stirring was begun after the sodium and naphthalene had melted, and continued during the course of the reaction. The reaction temperature was maintained at about 285° C. until the hydrogen pressure decreased by less than 10 pounds per square inch during a 10 minute interval. Thereafter, the hydrogenation was discontinued. Subsequent analysis and calculation disclosed a reaction rate constant for the hydrogenation of 0.110/min. The yield of tetralin calculated to be approximately 94 mole percent of the naphthalene introduced.

*Example II*

The following reactants were introduced to a stainless steel autoclave fitted with a mechanical stirrer:

|  | Grams |
|---|---|
| Naphthalene (80.2° C. melting point) | 200 |
| Isopropanol | 10 |
| Metallic sodium | 10 |

The reactor was purged with hydrogen. A positive hydrogen pressure of approximately 2,500 pounds per square inch gauge was then applied with the reactor heated to a temperature of 285° C. The temperature was maintained at this level until the pressure decreased by less than 10 pounds per square inch during a 10 minute interval. Thereafter, the hydrogenation was discontinued. Subsequent analysis and calculation disclosed a rate constant of 0.059/min. for the hydrogenation. The quantity of tetralin produced was calculated to be approximately 93 mole percent of the naphthalene introduced.

*Example III*

The following reactants were introduced to a stainless steel autoclave fitted with a mechanical stirrer:

|  | Grams |
|---|---|
| Naphthalene (80.2° C. melting point) | 200 |
| 2-ethylhexanol | 10 |
| Metallic sodium | 10 |

The reactor was purged with hydrogen. A positive hydrogen pressure of approximately 2,500 pounds per square inch gauge was then applied with the reactor heated to a temperature of 285° C. The temperature maintained at this level until the pressure decreased by less than 1 pound per square inch per minute over a 10 minute period. The reactor was cooled, and the pressure subsequently released when the temperature dropped to 50° C. Analysis and calculation from data obtained during the course of the experiment disclosed a reaction rate constant of 0.061/min. for the hydrogenation and a tetralin yield of approximately 89 mole percent of the naphthalene introduced.

*Example IV*

The following reactants were introduced to a stainless steel autoclave fitted with a mechanical stirrer:

|  | Grams |
|---|---|
| Naphthalene (80.2° C. melting point) | 200 |
| N-2-hydroxyethyl oleamide | 2 |
| Metallic sodium | 10 |

The reactor was purged with hydrogen. A positive hydrogen pressure of approximately 2,500 pounds per square inch gauge was then applied with the reactor heated to a temperature of 285° C. The temperature was maintained at this level until the hydrogen pressure decreased by less than 1 pound per square inch per minute over a 10 minute interval. Thereafter, the hydrogenation was discontinued. The reaction rate constant for the hydrogenation was calculated to be 0.052/min. Subsequent analysis showed the filtered product to contain approximately 92 percent tetralin by weight.

*Example V*

The following reactants were introduced to a stainless steel rocker bomb:

|  | Grams |
|---|---|
| Naphthalene (80.2° C. melting point) | 100 |
| Ortho-cresol | 5.0 |
| Metallic sodium | 3.0 |

The reactor was purged with hydrogen. A positive hydrogen pressure of approximately 2,500 pounds per square inch gauge was then applied with the reactor heated to a temperature of 285° C. Agitation was accomplished during the reaction by rocking the reactor. The temperature was maintained at approximately 285° C. until the pressure decreased by less than 10 pounds per square inch over a 10 minute interval. Thereafter, the hydrogenation was discontinued. The results obtained by subsequent analysis and calculation at the end of the experiment disclosed the reaction rate constant for the hydrogenation to be 0.063/min., and the yield of tetralin to be approximately 91 mole percent of the naphthalene introduced.

*Example VI*

The following reactants were introduced to a stainless steel rocker bomb:

|  | Grams |
|---|---|
| Naphthalene (80.2° C. melting point) | 100 |
| Mineral oil | 100 |
| Metallic sodium | 5 |
| Oleic acid | 4.7 |

The reactor was purged with hydrogen. A positive hydrogen pressure of approximately 1,900 pounds per square inch gauge was then applied with the reactor heated to a temperature of 240° C. Agitation was accomplished during a reaction period of 3 hours by rocking the reactor. The results obtained by subsequent analysis and calculation at the end of the experiment disclosed the reaction rate constant for the hydrogenation to be 0.006/min., and the yield of tetralin to be approximately 69 mole percent of the naphthalene introduced.

*Example VII*

The following reactants were introduced to a stainless steel rocker bomb:

|  | Grams |
|---|---|
| Naphthalene (80.2° C. melting point) | 100 |
| Mineral oil | 100 |
| Metallic sodium | 5 |
| Sodium oleate | 5.4 |

The reactor was purged with hydrogen. A positive hydrogen pressure of approximately 1,900 pounds per square inch gauge was then applied with the reactor heated to a temperature of 240° C. Agitation was accomplished during a reaction period of 3 hours by rocking the reactor. The results obtained by subsequent analysis and calculation at the end of the experiment disclosed the reaction rate constant for the hydrogenation to be 0.0065/min., and the yield of tetralin to be approximately 72 mole percent of the naphthalene introduced.

*Example VIII*

The following reactants were introduced to a stainless steel rocker bomb:

|  | Grams |
|---|---|
| Naphthalene (80.2° C. melting point) | 100 |
| Tetralin | 100 |
| Metallic sodium | 2.5 |
| Metallic potassium | 2.5 |
| 2-ethylhexanol | 2 |

The reactor was purged with hydrogen. A positive hydrogen pressure of approximately 2,000 pounds per square inch gauge was then applied and the reactor heated to a temperature of 150° C. Agitation was accomplished during the reaction by rocking the reactor. The reaction temperature was maintained at approximately 150° C. until the hydrogen pressure decreased by less than 1 pound per square inch per minute. Thereafter, the hydrogenation was discontinued. The results obtained by subsequent analysis and calculation disclosed the reaction rate constant for the hydrogenation to be 0.236/min., and the yield of tetralin to be approximately 73 mole percent of the naphthalene introduced.

This application is a continuation-in-part of copending application Serial No. 645,901, filed March 14, 1957, now abandoned.

What is claimed is:

1. An improved process for the alkali metal catalyzed hydrogenation of naphthalene which comprises admixing naphthalene with an alkali metal and an organic, active hydrogen compound selected from the group consisting of the primary and secondary aliphatic and aromatic amines, the phenols, the aliphatic and aromatic alcohols, the aliphatic and aromatic carboxylic acids, the aliphatic and aromatic carbonamides and carbonimides, the aromatic sulfonic acids, indene and fluorene, in a proportion of from about 0.1 part to about 10 parts of the active hydrogen compound and at least about 1 part of the alkali metal per 100 parts by weight of naphthalene, the proportion of alkali metal being sufficient to provide continually at least about 0.5 part of metallic alkali metal per 100 parts by weight of naphthalene in the resultant mixture, and contacting said mixture with hydrogen gas at a temperature of at least about 150° C., under a hydrogen pressure of at least about 250 pounds per square inch gauge.

2. An improved process for the sodium catalyzed hydrogenation of naphthalene which comprises admixing naphthalene with sodium and an organic, active hydrogen compound selected from the group consisting of the primary and secondary aliphatic and aromatic amines, the phenols, the aliphatic and aromatic alcohols, the aliphatic and aromatic carboxylic acids, the aliphatic and aromatic carbonamides and carbonimides, the aromatic sulfonic acids, indene and fluorene, in a proportion of from about 0.1 part to about 10 parts of the active hydrogen compound and at least about 1 part of sodium per 100 parts by weight of naphthalene, the proportion of sodium being sufficient to provide continually at least about 0.5 parts of metallic sodium per 100 parts of naphthalene in the resultant mixture, and contacting said mixture with hydrogen gas at a temperature of at least about 200° C., under a hydrogen pressure of at least about 400 pounds per square inch gauge.

3. An improved process for the sodium catalyzed hydrogenation of naphthalene, which comprises admixing naphthalene with sodium and stearic acid in a proportion of from about 0.1 part to about 10 parts of stearic acid and at least about 1 part sodium per 100 parts by weight of naphthalene, the proportion of sodium being sufficient to provide continually at least about 0.5 part of metallic sodium per 100 parts by weight of naphthalene in the resultant mixture, and contacting said mixture with hydrogen gas at a temperature of at least about 200° C. and under a hydrogen pressure of at least about 400 pounds per square inch gauge.

4. An improved process for the sodium catalyzed hydrogenation of naphthalene, which comprises admixing naphthalene with sodium and isopropanol in a proportion of from about 0.1 part to about 10 parts of isopropanol and at least about 1 part of sodium per 100 parts by weight of naphthalene, the proportion of sodium being sufficient to provide continually at least about 0.5 part of metallic sodium per 100 parts by weight of naphthalene in the resultant mixture, and contacting said mixture with hydrogen gas at a temperature of at least about 200° C. and under a hydrogen pressure of at least about 400 pounds per square inch gauge.

5. An improved process for the sodium catalyzed hydrogenation of naphthalene, which comprises admixing naphthalene with sodium and 2-ethylhexanol in a proportion of from about 0.1 part to about 10 parts of 2-ethylhexanol and at least about 1 part of sodium per 100 parts by weight of naphthalene, the proportion of sodium being sufficient to provide continually at least about 0.5 part of metallic sodium per 100 parts by weight of naphthalene in the resultant mixture, and contacting said mixture with hydrogen gas at a temperature of at least about 200° C. and under a hydrogen pressure of at least about 400 pounds per square inch gauge.

6. An improved process for the sodium catalyzed hydrogenation of naphthalene, which comprises admixing naphthalene with sodium and N-2-hydroxyethyl oleamide in a proportion of from about 0.1 part to about 10 parts of N-2-hydroxyethyl oleamide and at least about 1 part of sodium per 100 parts by weight of naphthalene, the proportion of sodium being sufficient to provide continually at least about 0.5 part of metallic sodium per 100 parts by weight of naphthalene in the resultant mixture, and contacting said mixture with hydrogen gas at a temperature of at least about 200° C. and under a hydrogen pressure of at least about 400 pounds per square inch gauge.

7. An improved process for the sodium catalyzed hydrogenation of naphthalene, which comprises admixing naphthalene with sodium and ortho-cresol in a proportion of from about 0.1 part to about 10 parts of ortho-cresol and at least about 1 part of sodium per 100 parts by weight of naphthalene, the proportion of sodium being sufficient to provide continually at least about 0.5 part of metallic sodium per 100 parts by weight of naphthalene in the resultant mixture, and contacting said mixture with hydrogen gas at a temperature of at least about 200° C. and under a hydrogen pressure of at least about 400 pounds per square inch gauge.

References Cited in the file of this patent
UNITED STATES PATENTS

| | | |
|---|---|---|
| 2,182,242 | Wooster | Dec. 5, 1939 |
| 2,473,997 | Hansley | June 21, 1949 |
| 2,929,854 | Wilson et al. | Mar. 22, 1960 |